Figure 1:
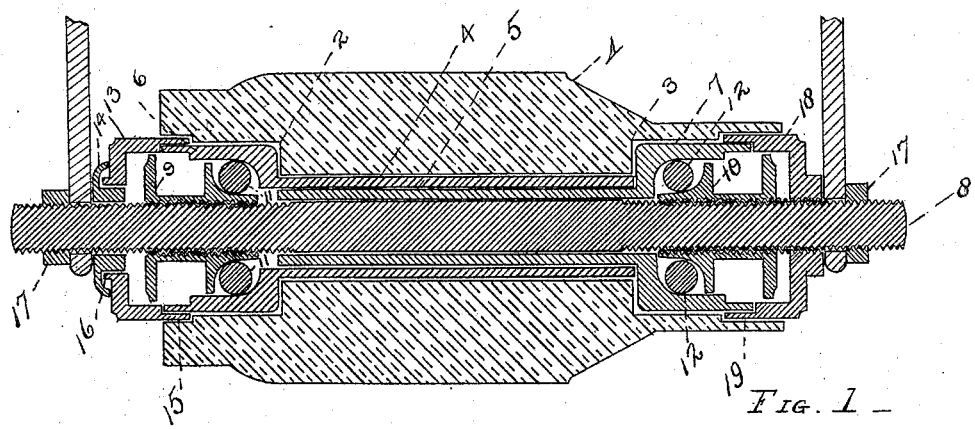

(No Model.) 3 Sheets—Sheet 1.

C. H. BROWN, H. W. MEYER & H. SCHIEWETZ.
BOX FOR VEHICLE WHEELS.

No. 492,384. Patented Feb. 28, 1893.

WITNESSES:
John A. Hiller
George H. Wood

INVENTORS
Chas. H. Brown
Henry W. Meyer
Henry Schiewetz
By Toulmin, McCarty & Toulmin
ATTORNEYS (No Model.) 3 Sheets—Sheet 2.
C. H. BROWN, H. W. MEYER & H. SCHIEWETZ.
BOX FOR VEHICLE WHEELS.

No. 492,384. Patented Feb. 28, 1893.

(No Model.) 3 Sheets—Sheet 3.
C. H. BROWN, H. W. MEYER & H. SCHIEWETZ.
BOX FOR VEHICLE WHEELS.
No. 492,384. Patented Feb. 28, 1893.
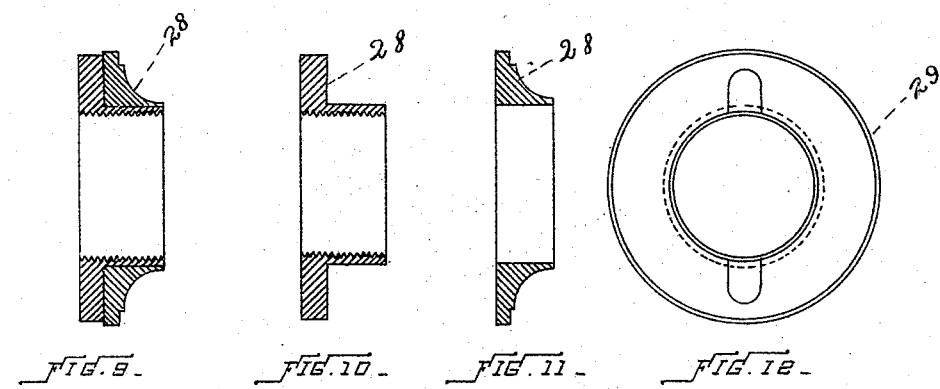
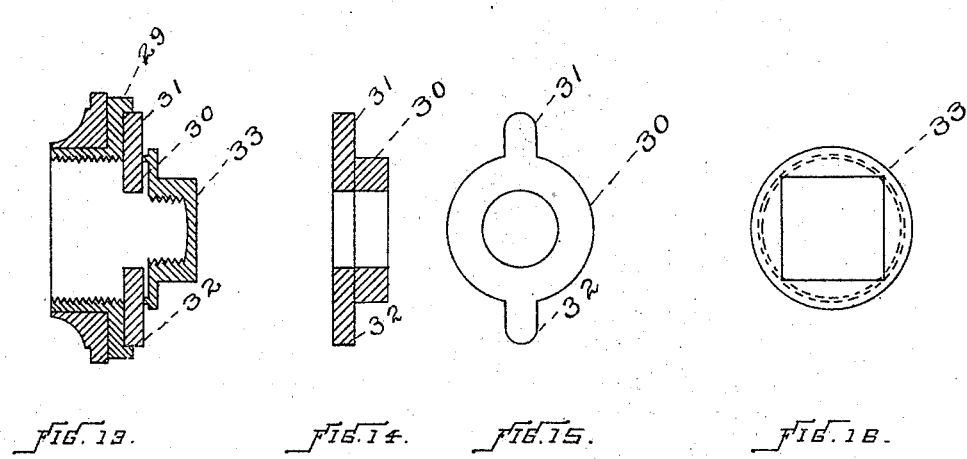
WITNESSES:
John A. Miller.
George H. Wood.
INVENTOR,
Chas. H. Brown,
Henry W. Meyer,
Henry Schiewetz
By Toulmin, McCarty & Toulmin
ATTORNEYS

United States Patent Office.

CHARLES H. BROWN, HENRY W. MEYER, AND HENRY SCHIEWETZ, OF DAYTON, OHIO, ASSIGNORS TO THE S. N. BROWN & COMPANY, OF SAME PLACE.

BOX FOR VEHICLE-WHEELS.

SPECIFICATION forming part of Letters Patent No. 492,384, dated February 28, 1893.

Application filed November 17, 1892. Serial No. 452,354. (No model.)

*To all whom it may concern:*

Be it known that we, CHARLES H. BROWN, HENRY W. MEYER, and HENRY SCHIEWETZ, of Dayton, county of Montgomery, State of Ohio, have invented a new and useful Improvement in Boxes for Vehicle-Wheels, of which the following is a specification.

This invention relates to new and useful improvements in axle boxes.

The objects attained by our invention are in general, to improve the bearings of vehicle axles to an extent that will bring them to a higher state of perfection, and thereby render their working more satisfactory.

To this end our improvements have reference to means for preventing the spindle lubricant from finding its way to the hub; and further, to means for preventing dust, sand or other foreign substances from entering the bearings and interfering with a perfect working thereof; and still further, to providing an axle boxing in which the bearings are equally and simultaneously distributed at both ends of the box, by reason of the ends of the sleeves comprising the box, being on a true horizontal line with each other, which is accomplished by inserting the sleeves in a manner that brings the longitudinal surface of one in bearing with the longitudinal surface of the other, over which it fits, and an absolute dispensing with screw threads on either sleeve, which dispensation is necessary in order to equalize the strain on the bearing points, all of which will be fully described in the specification, and pointed out in the claims.

While we have shown in the drawings an application of our improvements to ball bearings, we do not wish to be understood as meaning that they are only susceptible of such use, on the contrary, they may used with any manner of bearing suitable for vehicle wheels, with some modifications that will not necessitate a departure from the essential features of our invention.

Figures 2, 3:
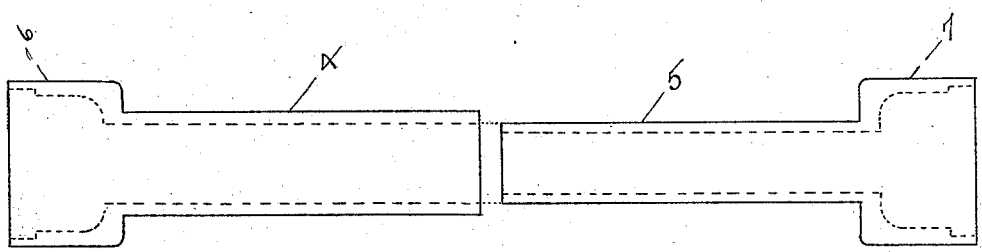
Figures 4, 5:
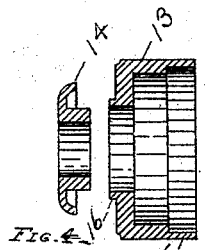
Figure 6:
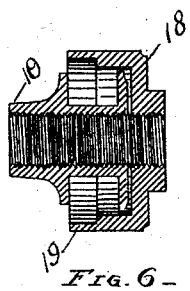
Figure 7:
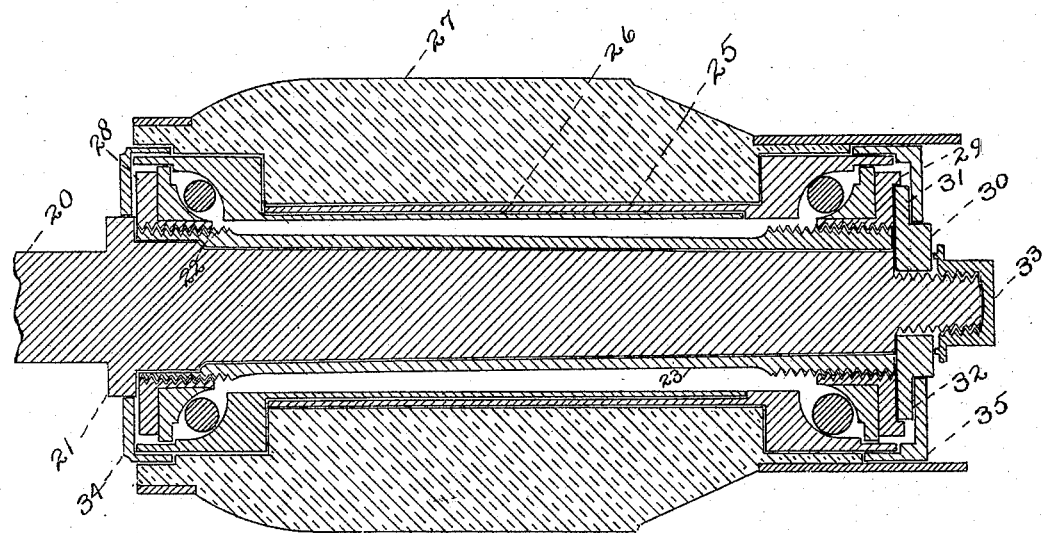
Figure 8:
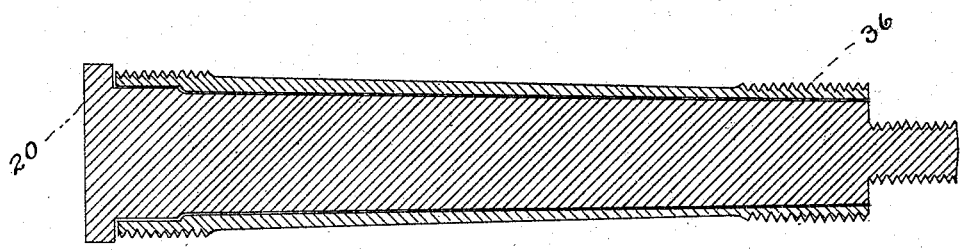

In the accompanying drawings the same characters of reference are used to indicate corresponding parts throughout the several views, of which, Figure 1, is a longitudinal section of the hub and box. Figs. 2, and 3, detailed, detached views of the sleeves constituting the box. The dotted lines show the internal construction. Figs. 4, and 5, detail, cross sections of the inner end dust-cap. Fig. 6, detail section of the outer end dust-cap, and the adjustable cone. Fig. 7, a longitudinal section of a modified form of bushing, adapting our improvements to use in connection with any vehicle axle. Fig. 8, a detail view of the spindle and sleeve, a modification of that shown in Fig. 7, in which the third sleeve, or the sleeve nearest the spindle, is constructed with a less extent of bushing to engage with the cone, which reduces the weight of the box. Fig. 9, a detail, detached sectional view of a modified form of cone. Figs. 10, and 11, detail, detached views in section, of the two parts of the modified cone, detached from each other. Fig. 12, an end view of the outer end cone, showing the slots into which the washer fits. Fig. 13, detail, detached sectional view of outer cone, washer and set nut. Fig. 14, a vertical section of the washer, detached. Fig. 15, a plan view of the washer, detached. Fig. 16, outer end view of the set nut.

For a detailed and minute description,—1, indicates the hub of a vehicle, with shoulders 2, and 3, and the usual metal bands encircling the ends.

4, and 5, indicate outer and inner sleeves provided flanges 6, and 7, terminating at their outer ends in a conical interior; these flanges abut against the shoulders of the hub, when the outer sleeve is sleeved upon the inner sleeve; the outer end of the outer sleeve 4, also abuts snugly against flanges 7, of the inner sleeve, and thereby a substantial barrier is raised against the entry of oil from the spindle 8, to the hub.

9, and 10, indicate an inner and outer collar or cone, the latter being adjustable, and between which cones and the annular conical surfaces of flanges 6, and 7, the ball bearings 11, and 12, are located. The inner dust cap is composed of two parts, 13, and 14; part 13, is provided with an annular shoulder, against which abuts the outer end of flange 6, as indicated by 15, from which it will be seen that this part of the dust-cap incloses the sleeve; part 13, is also provided with a rim 16, projecting laterally from near the center thereof, and which is adapted to fit snugly against part 14, when the said part 14, is tightened against part 13, by the action of the set nut 17. The inwardly projecting rim of part 13, also tightens in a like manner against the outer surface of part 14, and thus is constructed a most substantial means for protecting the bearings from the accumulations of dust, at a point where it is usually most difficult to protect them.

At the outer end of the hub, we provide a one-part dust cap 18, with annular shoulder 19, against which abuts the outer extremity of flange 7,—this dust cap is similar to part 14, of the inner end dust cap, in that it is screwed directly on the spindle, which it will be observed is not the case with part 13. It is readily understood that the dust created by a moving vehicle is thrown in the direction of the inner bearing, and away from the outer; these considerations have caused us to modify, somewhat, the construction as herein shown.

All the parts, it will be understood, are designed to fit closely.

In the modification shown in Fig. 7, the spindle 20, is of the ordinary slanting kind, provided with flange 21, and shoulder 22; upon this spindle is sleeved a third sleeve 23, having a screw-threaded shoulder, comprising the bushing, on its outer end by which the bearings are brought to a true horizontal plane, and distributed equally. Sleeves 25, and 26 are similar in construction to sleeves 4, and 5, in Fig. 1, and abut against the shoulders of hub 27, in the same manner.

28, represents the inner and 29, the outer end cone, which are preferably constructed in two parts, to avoid the necessity of dispensing with the entire cone when usage has rendered it no longer useful; the conical portion thereof, is constructed of hardened steel; it is detachable and may be replaced with a new part. The outer end cone, 29, is adjustable by means of a washer 30, having arms 31, and 32, adapted to fit in slots provided therefor in the outer surface of the outer part of said cone. A set nut 33, tightens the washer against the cone and the sleeve 23, thereby maintaining them rigidly, while the hub, sleeves 25, and 26 and the dust caps 34, and 35 revolve. It will be observed in the form shown in Fig. 1, the inner two-part dust cap revolves alone with the sleeves and hub.

The spindle sleeve 23, may be decreased in weight by reducing the thickness of the bushing as shown at 36, in Fig. 8, and to that extent the weight of running gear of the vehicle reduced.

Having fully described our invention, what we claim as new, and desire to secure by Letters Patent, is—

1. In an axle hub, the combination with the hub, of an inner and outer sleeve with flanges, said flanges having conical-shaped interiors; the sleeves adapted to fit one in the other, a stationary two-part dust proof cap at the inner end, and a one part rotatable dust-proof cap at the outer end of the hub, said dust proof caps adapted to inclose the flanged ends of the sleeves, substantially as herein described.

2. The combination with a vehicle hub, of sleeves 4, and 5, with flanges 6, and 7, and the dust proof cap consisting of parts 13, and 14, substantially as herein shown and described.

3. The combination with a vehicle hub, of sleeves 4 and 5, having flanges 6, and 7, the inner end dust proof cap, composed of parts 13, and 14, and the outer end dust proof cap, composed of a single part, substantially as herein described.

4. In a vehicle hub, the combination with the hub, of a boxing consisting of an inner and outer sleeve, one adapted to inclose the other, and thereby bring their ends on a true horizontal plane with each other, said sleeves having flanges against which abuts a dust proof cap composed of parts 13 and 14, and the dust proof cap 18, substantially as herein described.

5. In a vehicle hub, the combination with the hub, of sleeves 25, and 26, with flanges having conical shaped interiors, and the sleeve 23, and the dust proof caps 34, and 35, adapted to inclose the flanged ends of said sleeves, 25, and 26, substantially as herein described.

In testimony whereof we have hereunto set our hands this 6th day of November, 1892.

CHARLES H. BROWN.
HENRY W. MEYER.
HENRY SCHIEWETZ.

Witnesses:
ALBERT EMANUEL,
DAVID EMANUEL.